M. B. MORGAN.
SPRING SUSPENSION FOR TRACK LAYING TRACTORS.
APPLICATION FILED JULY 20, 1920.
1,380,577. Patented June 7, 1921.
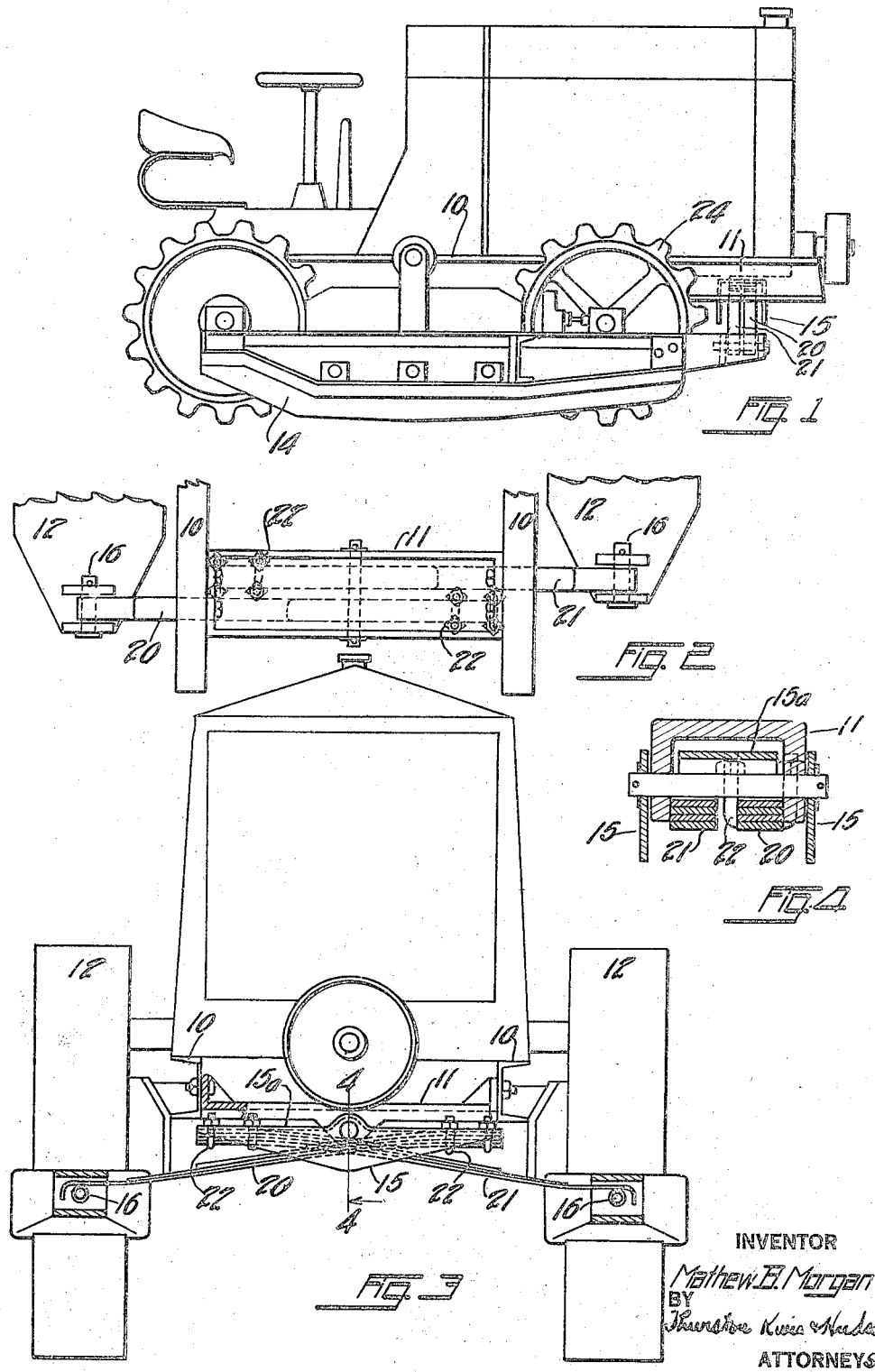
INVENTOR
Mathew B. Morgan
BY
ATTORNEYS

UNITED STATES PATENT OFFICE.

MATHEW B. MORGAN, OF CLEVELAND HEIGHTS, OHIO, ASSIGNOR TO THE CLEVELAND TRACTOR COMPANY, OF EUCLID, OHIO, A CORPORATION OF OHIO.

SPRING SUSPENSION FOR TRACK-LAYING TRACTORS.

1,380,577.   Specification of Letters Patent.   Patented June 7, 1921.

Application filed July 20, 1920. Serial No. 397,610.

*To all whom it may concern:*

Be it known that I, MATHEW B. MORGAN, a citizen of the United States, residing at Cleveland Heights, in the county of Cuyahoga and State of Ohio, have invented a certain new and useful Improvement in Spring Suspensions for Track-Laying Tractors, of which the following is a full, clear, and exact description.

The object of this invention is to provide a very efficient spring suspension by means of which an end of the main frame of a track laying tractor may be suspended upon corresponding ends of the two endless track structures which lie on opposite sides of said main frame.

The invention consists in the construction and combination of parts shown in the drawing and hereinafter described and pointed out definitely in the appended claims.

In the drawing, Figure 1 is a side elevation of a track laying tractor to which the present invention is applied; Fig. 2 is a plan view of the front end of said tractor; Fig. 3 is a front elevation of said tractor, and Fig. 4 is a central vertical section on the line 4—4 on Fig. 3.

Referring to the parts by reference characters, 10 represents the main motor carrying frame of a track laying tractor; and 12, 12, represent two endless track structures which are respectively located on opposite sides of the main frame. The invention is exemplified in a track laying tractor of which each endless track structure includes a track frame 14,—the rear ends of said track frames being pivoted on alined axes to the rear end of the main frame.

15 represents an equalizer bar which is preferably substantially channel shaped in cross section. This is centrally pivoted on a longitudinal axis to a cross beam 11 which is a rigid part of the main frame, and is located preferably a little way back from its front end. The channel-shaped equalizer bar is preferably made of sheet metal, and when pivoted as stated has its open channel side down.

20 and 21 represent leaf springs. Each is secured at its thick end in the channel of the bar 15 and to said bar near one end thereof by U bolts 22 or other suitable means. Each spring extends from its connection with the equalizer bar transversely across the machine and into engagement with the front end of that track frame 15 which lies on the opposite side of the main frame. A serviceable engagement between said spring and track frame may be effected by having the springs rest slidably upon a longitudinally extended pin 16 secured in a transverse hole 17 in that part of the track frame which lies in front of the front idler 24 over which the track belt runs,—in which event the top of the hole overhangs the ends of the spring and keeps it in engagement with the pin.

These springs lie side by side one behind the other, and the top member 15$^a$ of the equalizer bar overhangs both. When, in operating the tractor, the front end of the endless track structure on one side of the main frame, for example, the left side, strikes an obstruction, said end of the track structure will be raised. The shock incident to the striking of this obstruction will be very largely absorbed by that spring 21 which engages that particular endless track structure; and therefore if the obstruction is not high there will be very little, if any, movement of the equalizer bar. If the obstruction be higher the equalizer bar will be rocked, the left end thereof moving upward precisely as if the spring 21 were connected with the left end instead of being connected with the right end of said equalizer bar. If the obstruction in the road is unusually high the resulting downward movement of the right end of the equalizer bar will carry it against the spring 20 on the opposite side of the machine, which spring will thereafter yieldingly resist further rocking movement of the equalizer bar.

By this construction unusually long and resilient springs may be employed; the advantage of an equalizer bar is secured; and both springs, under certain circumstances, yieldingly resist that upward movement of either endless track structure which results from encountering the obstructions in the road.

Having described my invention, I claim:

1. In a track laying tractor, the combination of a main frame, two endless track structures located respectively on opposite sides of the main frame, an equalizer bar centrally pivoted to the main frame on a longitudinal axis near one end of said main frame and two leaf springs which are respectively connected to said equalizer bar near opposite ends thereof,—each spring being extended from its point of connection with the equalizer bar transversely across the machine and into operative engagement with that endless track structure which lies on the opposite side of the main frame.

2. In a track laying tractor, the combination of a main frame, two endless track structures located respectively on opposite sides thereof, an equalizer bar which is of channel bar section and is pivoted centrally to the main frame with its open or channel side down, two transverse leaf springs which lie one behind the other and are respectively secured to the bar in said channel, one to one end of the equalizer bar and one to the other end of said equalizer bar,—each spring extending from its point of connection with the equalizer bar transversely across the machine beneath the equalizer bar, and into operative engagement with that endless track structure which lies on the opposite side of the main frame.

In testimony whereof, I hereunto affix my signature.

MATHEW B. MORGAN.